US010857832B2

(12) United States Patent
Hannig

(10) Patent No.: US 10,857,832 B2
(45) Date of Patent: *Dec. 8, 2020

(54) METHOD FOR PRODUCING A DECORATED WALL OR FLOOR PANEL

(71) Applicant: Akzenta Paneele + Profile GMBH, Kaisersesch (DE)

(72) Inventor: Hans-Jürgen Hannig, Bergisch Gladbach (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 163 days.

This patent is subject to a terminal disclaimer.

(21) Appl. No.: 15/756,329

(22) PCT Filed: Sep. 23, 2016

(86) PCT No.: PCT/EP2016/072764
§ 371 (c)(1),
(2) Date: Feb. 28, 2018

(87) PCT Pub. No.: WO2017/051009
PCT Pub. Date: Mar. 30, 2017

(65) Prior Publication Data
US 2018/0272796 A1 Sep. 27, 2018

(30) Foreign Application Priority Data

Sep. 24, 2015 (EP) ..................................... 15186744

(51) Int. Cl.
B44C 5/04 (2006.01)
B32B 5/16 (2006.01)
(Continued)

(52) U.S. Cl.
CPC .............. *B44C 5/04* (2013.01); *B29C 41/003* (2013.01); *B29C 41/28* (2013.01); *B29C 43/24* (2013.01);
(Continued)

(58) Field of Classification Search
CPC . B29C 2043/483; B29C 41/003; B29C 41/28; B29C 43/24; B29C 43/48;
(Continued)

(56) References Cited

U.S. PATENT DOCUMENTS 4,411,931 A  10/1983 Duong
6,096,383 A   8/2000 Berg et al.
(Continued)

FOREIGN PATENT DOCUMENTS

CL       43115        9/2005
CL    201400262      11/2014
(Continued)

OTHER PUBLICATIONS

Office Action regarding Korean Patent Application No. 10-2019-7014856, dated Jun. 10, 2020.
(Continued)

*Primary Examiner* — Frances Tischler
(74) *Attorney, Agent, or Firm* — Harness, Dickey & Pierce, P.L.C.

(57) ABSTRACT

The disclosure relates to a carrier material for producing a carrier for a decorated wall or floor panel, wherein the carrier material comprises a matrix material having a plastic and a solid material, wherein the solid material is formed by talc in a proportion of at least 50 wt.-%, in particular at least 80 wt.-%, in particular at least 95 wt.-% in relation to the solid material, wherein the matrix material is present in a quantity of >30 wt.-% to <70 wt.-%, in particular >40 wt.-% to <60 wt.-% in relation to the carrier material, and wherein
(Continued)

Figure 1:
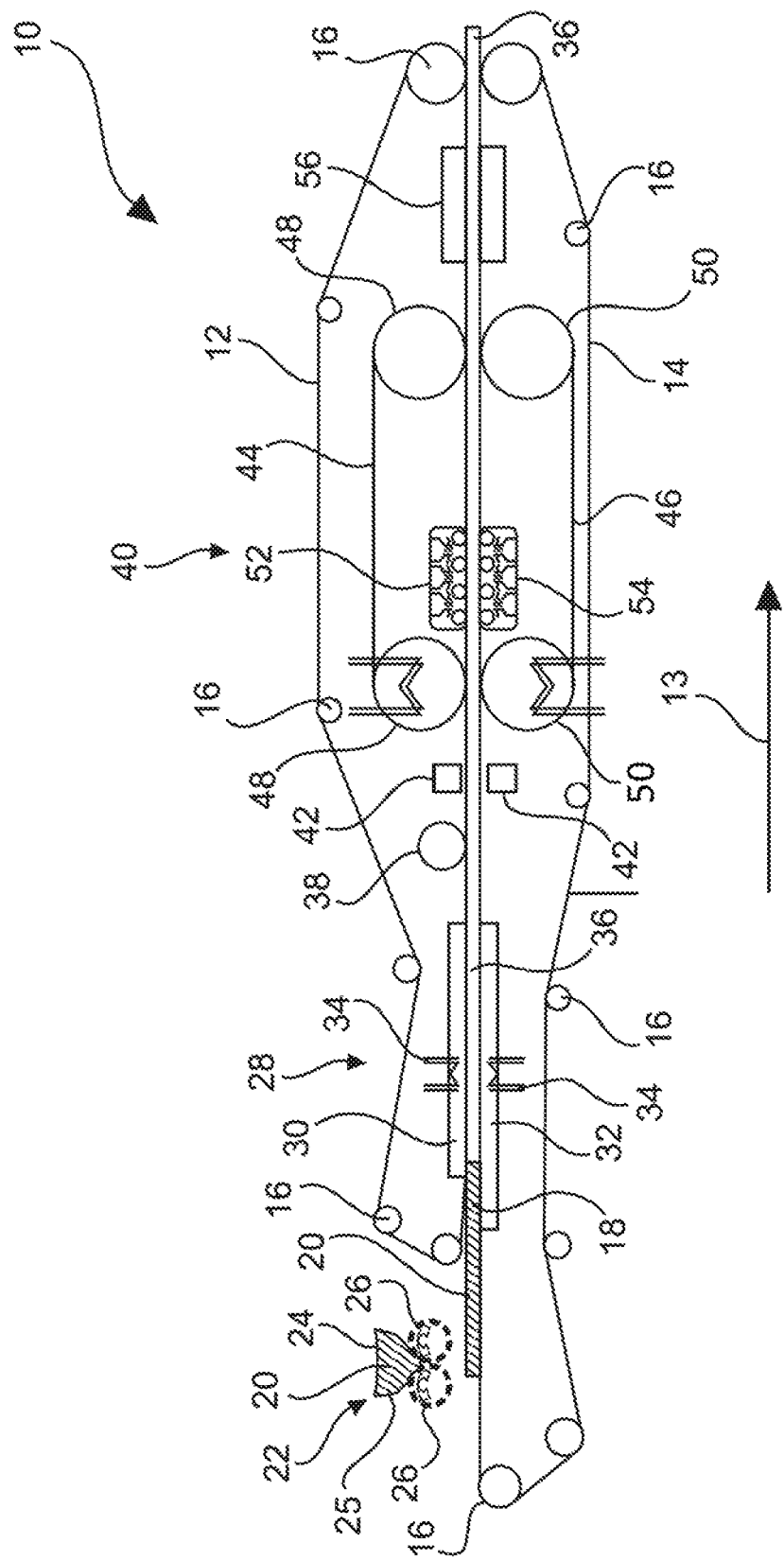

the solid material is present in a quantity of >30 wt.-% to <70 wt.-%, in particular >40 wt.-% to <60 wt.-% in relation to the carrier material, and wherein the matrix material and the solid material together are present in a quantity of >95 wt.-%, in particular ≥99 wt.-% in relation to the carrier material. In summary, said carrier material provides the advantage of good producibility alongside high dimensional stability, in particular relating to moisture and temperature influence, and good mechanical characteristics. The disclosure also relates to a method for producing a decorated wall or floor panel with the carrier according to the disclosure.

10 Claims, 2 Drawing Sheets

(51) Int. Cl.
| | | |
|---|---|---|
| *B32B 27/18* | (2006.01) | |
| *B32B 27/32* | (2006.01) | |
| *B29C 43/48* | (2006.01) | |
| *B29C 41/00* | (2006.01) | |
| *B29C 41/28* | (2006.01) | |
| *B32B 27/06* | (2006.01) | |
| *B29C 43/24* | (2006.01) | |
| *B32B 27/08* | (2006.01) | |
| *B29K 23/00* | (2006.01) | |
| *B29K 509/00* | (2006.01) | |

(52) U.S. Cl.
CPC .............. *B29C 43/48* (2013.01); *B32B 5/16* (2013.01); *B32B 27/06* (2013.01); *B32B 27/08* (2013.01); *B32B 27/18* (2013.01); *B32B 27/32* (2013.01); *B29C 2043/483* (2013.01); *B29K 2023/0633* (2013.01); *B29K 2023/12* (2013.01); *B29K 2509/00* (2013.01); *B32B 2260/025* (2013.01); *B32B 2260/046* (2013.01); *B32B 2264/10* (2013.01); *B32B 2270/00* (2013.01); *B32B 2307/3065* (2013.01); *B32B 2307/72* (2013.01); *B32B 2419/00* (2013.01); *B32B 2451/00* (2013.01); *B32B 2471/00* (2013.01); *B32B 2607/00* (2013.01)

(58) Field of Classification Search
CPC ........ B29K 2023/0633; B29K 2023/12; B29K 2509/00; B32B 2260/025; B32B 2260/046; B32B 2264/10; B32B 2270/00; B32B 2307/3065; B32B 2307/72; B32B 2419/00; B32B 2451/00; B32B 2471/00; B32B 2607/00; B32B 27/06; B32B 27/08; B32B 27/18; B32B 27/32; B32B 5/16; B44C 5/04

See application file for complete search history.

(56) References Cited

U.S. PATENT DOCUMENTS

| | | |
|---|---|---|
| 6,888,147 B1 | 5/2005 | Hansson et al. |
| 8,011,299 B2 | 9/2011 | Vosahlo |
| 2002/0059762 A1 | 5/2002 | Takeuchi et al. |
| 2004/0009338 A1 | 1/2004 | Jo et al. |
| 2007/0035601 A1 | 2/2007 | Jang |
| 2009/0305008 A1 | 12/2009 | Nichols et al. |
| 2013/0176370 A1 | 7/2013 | Loccufier |
| 2014/0349087 A1 | 11/2014 | Jung et al. |
| 2015/0343761 A1 | 12/2015 | Roeder et al. |
| 2016/0067949 A1 | 3/2016 | Peltola |
| 2017/0008334 A1 | 1/2017 | Hoff |
| 2018/0272796 A1 | 9/2018 | Hannig |
| 2019/0241009 A1 | 8/2019 | Hannig et al. |
| 2019/0367716 A1 | 12/2019 | Hannig et al. |

FOREIGN PATENT DOCUMENTS

| | | |
|---|---|---|
| CN | 102119076 A | 7/2011 |
| DE | 19722339 A1 | 12/1998 |
| DE | 102013105728 A1 | 12/2014 |
| DE | 202016101306 U1 | 4/2016 |
| EP | 1836232 A1 | 9/2007 |
| EP | 2829415 A1 | 1/2015 |
| EP | 2942208 A1 | 11/2015 |
| EP | 3147135 A1 | 3/2017 |
| JP | 2016508080 A | 3/2016 |
| WO | WO-2004043667 A1 | 5/2004 |
| WO | WO-2008122668 A1 | 10/2008 |
| WO | WO-2015128255 A1 | 9/2015 |
| WO | WO-2015158649 A1 | 10/2015 |
| WO | 2016091819 A1 | 6/2016 |

OTHER PUBLICATIONS

Office Action regarding Chilean Application No. 201901137, dated Jun. 17, 2020; 14 pages.

Office Action regarding Chinese Patent Application No. 201780066858X, dated Jul. 3, 2020.

METHOD FOR PRODUCING A DECORATED WALL OR FLOOR PANEL

CROSS-REFERENCE TO RELATED APPLICATIONS

This application is a National Stage of International Application No. PCT/EP2016/072764, filed on Sep. 23, 2016, and published in German as WO2017/051009 A1 on Mar. 30, 2017. This application claims the priority to European Patent Application No. 15186744.7, filed on Sep. 24, 2015. The entire disclosures of the above applications are incorporated herein by reference.

FIELD

The present disclosure relates to a carrier material for producing a decorated wall or floor panel. The present disclosure further relates to a floor panel comprising such a carrier material and a method for producing a decorated wall or floor panel.

Decorated panels are known per se, wherein the term wall panels also includes panels, which are suitable as a ceiling or door cladding. They usually consist of a carrier or a core made of a solid material such as a wood material which is provided on at least one side with a decorative layer and a top layer and optionally with other layers such as a wearing layer arranged between the decorative and the top layers. The decorative layer is usually a printed paper which is impregnated with a resin. The top layer and the other layers are usually made of resin, too.

BACKGROUND

This section provides background information related to the present disclosure which is not necessarily prior art.

From document EP 2829415 A1, moreover, a method for producing a decorated wall or floor panel is known in which starting from a granular carrier material a carrier and subsequently a panel is formed. In such a method, for example, a WPC material can be used as carrier material.

Here, the production of the panels under certain circumstances still offers potential for improvement. Potential for improvement can arise in particular with respect to the moisture resistance and the heat resistance.

SUMMARY

This section provides a general summary of the disclosure, and is not a comprehensive disclosure of its full scope or all of its features.

It is therefore the object of the present disclosure to provide an improved method for producing decorated wall or floor panels.

This object is achieved by a carrier material according to claim 1. This object is further achieved by a panel according to claim 14. Preferred embodiments of the disclosure are provided in the dependent claims, in the specification or in the figures, wherein further features described or illustrated in the dependent claims or in the specification or in the figures individually or in any combination may represent a subject matter of the disclosure, unless the opposite is not clear from the context. In particular, the amounts and characteristics of the respective materials or substances mentioned below can be combined with each other in any way.

The disclosure proposes a carrier material for producing a carrier for a decorated wall or floor panel. The carrier material comprises i) a matrix material comprising a plastic material and ii) a solid material, wherein the solid material is constituted by talcum to at least 50 wt.-%, in particular at least 80 wt.-%, particularly preferably at least 95 wt.-%, based on the solid material. In this case, the matrix material, based on the carrier material, is present in an amount from ≥30 wt.-% to ≤70 wt.-%, in particular ≥40 wt.-% to ≤60 wt.-%, and the solid material, based on the carrier material, is present in an amount from ≥30 wt.-% to ≤70 wt.-%, in particular ≥40 wt.-% to ≤60 wt.-%, for example less than or equal to 50 wt.-%. Furthermore, it is envisaged that the carrier material and the solid material, based on the carrier material, in common are present in an amount of ≥95 wt.-%, in particular ≥99 wt.-%.

Surprisingly, it has been found, that such a carrier material allows the production of a wall or floor panel with an improved moisture resistance, in particular with a reduced moisture or heat-related swelling.

The term "decorated wall or floor panel" or "decorative panel" in the context of the disclosure in particular means wall, ceiling, door or floor panels which comprise a decoration which simulates a decorative template and is applied on a carrier plate. Herein, decorative panels are used in a variety of ways both in the field of interior design of rooms and for decorative claddings of buildings, for example in exhibition stand construction. One of the most common application fields of decorative panels is their use as a floor covering. The decorative panels often comprise a decoration intended to replicate a natural material.

Examples of such replicated natural materials or decorative templates are wood species such as maple, oak, birch, cherry, ash, walnut, chestnut, wenge or even exotic woods such as Panga-Panga, mahogany, bamboo and bubinga. In addition, often natural materials such as stone surfaces or ceramic surfaces are replicated.

In the sense of the present disclosure the term "decorative template" in particular means such an original natural material or at least one surface of such a material, which is to be imitated or replicated by the decoration.

The term "pourable" material may in particular mean a material which can be applied onto a substrate by a bulk process or a scattering process. Herein, the material may be present as a fluid or in particular as a pourable solid.

Furthermore, a "granulate" or a "granular material" may be understood as a solid or a bulk material of a solid which comprises a plurality of solid particles, such as grains or beads, or consists thereof. By way of example, but not limited thereto, granular or powdered materials can be mentioned, here.

As a "carrier" in particular a layer can be understood which serves as a core or basic layer in a finished panel and which in particular may comprise a natural material, such as a wood material, a fiber material or a material comprising a plastic. For example, the carrier can already provide a suitable stability to the panel or contribute thereto.

Accordingly, as a carrier material a material can be understood which forms the carrier at least to a predominant part. In particular, the carrier may consist of the carrier material.

Here, as a "web-shaped carrier" a carrier can be understood which for example has a web-like shape in its production process and therefore has a significantly greater length compared to its thickness or its width, and the length of which may be, for example, greater than 15 meters.

The term "plate-shaped carrier" in the sense of the present disclosure may be understood as a carrier, which is formed from the web-shaped carrier by separation and is formed in the shape of a plate. Moreover, the plate-shaped carrier may already define the shape and/or size of the panel to be produced. However, the plate-shaped carrier can also be provided as a large plate. A large plate in the sense of the disclosure is in particular a carrier whose dimensions several times exceed the dimensions of the final decorative panels, and which in the course of the manufacturing process is separated in a corresponding plurality of decorative panels, for example by sawing, laser or water jet cutting. For example, the large plate may correspond to the web-shaped carrier.

A previously described substrate is thus used in particular to produce a carrier for a decorated wall or floor panel. The carrier material comprises substantially two materials, wherein a material according to the present disclosure means both a homogeneous material, i.e. a material formed of only one substance, as well as a heterogeneous material, i.e. a material consisting of at least two substances, wherein the latter material, thus, can also be referred to as a substance mixture.

In detail, the carrier material comprises a solid material and a matrix material. Herein, the solid material is formed of talcum at least to 50 wt.-%, in particular at least 80 wt.-%, for example 100 wt.-%, based on the solid material. Talcum means in a manner known per se a magnesium silicate hydrate which, for example, may have the chemical formula $Mg_3[Si_4O_{10}(OH)_2]$. Thus, the solids content is advantageously formed at least by a large proportion of the mineral material talcum, wherein this material can be used in a powder form or may be present in the carrier material in the form of particles. Basically, the solid material can consist of a solid in powder form.

It may be advantageous if the specific surface density according to BET, ISO 4652 of the talcum particles is in a range from $\geq 4$ $m^2/g$ to $\leq 8$ $m^2/g$, such as in a range from $\geq 5$ $m^2/g$ to $\leq 7$ $m^2/g$.

Furthermore, it may be advantageous if the talcum is present at a bulk density according to DIN 53468 in a range from $\geq 0.15$ $g/cm^3$ to $\leq 0.45$ $g/cm^3$, such as in a range from $\geq 0.25$ $g/cm^3$ to $\leq 0.35$ $g/cm^3$.

The matrix material serves in particular to receive or embed the solid material in the finished carrier. Here, the matrix material comprises a plastic or a plastic mixture. In particular with reference to the production method, as described in detail below, it may be advantageous that the matrix material comprises a thermoplastic material. Thus, it is possible that the carrier material or a component of the carrier material has a melting point or a softening point in order to shape the carrier material in a further process step by the action of heat, as described in detail below with reference to the method. The matrix material may in particular consist of a plastic or a plastic mixture and optionally an adhesion promoter. Preferably, these components can contribute to at least 90 wt.-%, more preferably at least 95 wt.-%, in particular at least 99 wt.-% of the matrix material.

In detail, it is further contemplated that the matrix material, based on the carrier material, is present in an amount from $\geq 30$ wt.-% to $\leq 70$ wt.-%, in particular $\geq 40$ wt.-% to $\leq 60$ wt.-%. Furthermore, it is contemplated that the solid material, based on the carrier material, is present in an amount from $\geq 30$ wt.-% to $\leq 70$ wt.-%, in particular $\geq 40$ wt.-% to $\leq 60$ wt.-%.

Depending on the desired field of application and the desired properties of the panel, the proportions of the matrix material or the solid material can be selectable. This can enable a good adaptability to the desired field of application. Basically, however, it may be preferred, that the proportion of the solid material is less than or preferably greater than or equal to the proportion of the matrix material.

With respect to the carrier material, it is further contemplated that the matrix material and the solid material, based on the carrier material, in common are present in an amount of $\geq 95$ wt.-%, in particular $\geq 99$ wt.-%. In other words, it may be provided that in addition to the solid material and the matrix material further substances are present in the carrier material, based on the carrier material, only in an amount of $<5$ wt.-%, preferably $<1$ wt.-%. Thus, it may be advantageous that the carrier material consists to a large extent of the solid material and the matrix material. Particularly preferably, it may be provided that the matrix material and the solid material, based on the carrier material, in common are present in an amount of 100 wt.-% such that the carrier material consists solely of the matrix material and the solid material.

By limiting the materials of the carrier and thus by a small number of materials for the production of the carrier, the carrier can be produced particularly cost-efficient. In addition, the process control in the production of a carrier or a panel can be very simple, so that the production, too, is simple and cost-efficient.

A previously described carrier material, moreover, offers in particular the advantage to enable the production of a panel exhibiting a good moisture resistance. In particular, by use of a carrier material as described above swelling of a panel made of the carrier material upon exposure to moisture can be significantly reduced or even completely prevented. Further, a heat-related expansion can be prevented or at least significantly reduced. This enables that a laying or attachment of panels produced with the carrier material is considerably simplified and/or that problems occurring after the laying or attachment of the panels are significantly reduced.

At the same time, the carrier material offers the advantage that panels produced therefrom have a very good stability, so that the risk of damages of the panel during the transport and during use is extremely low. This can be achieved in particular by means of the solid material, i.e. in particular by means of the talcum contained.

Due to the fact that the matrix material comprises in particular a plastic such as a thermoplastic material, it may be enabled despite of the high stability that panels produced from the carrier material can be highly flexible or resilient, which allows a comfortable impression when walked upon, and which may further reduce noises occurring during walking as compared to conventional materials, such that an improved impact sound can be realized.

In particular, thermoplastic materials also offer the advantage that the products produced therefrom can be easily recycled. This results in a further possibility to reduce the manufacturing cost.

A carrier produced from the carrier material may further be provided with a decoration without any problems. For example, such a carrier is particularly suitable for printing in particular by use of a digital printing process, for example, an inkjet printing process. Thereby, such carriers can be easily provided with a high-quality decoration, which may enable the production of a high-quality panel.

Preferably, it may be provided that talcum is present in the form of particles having a particle size $D_{50}$ in the range from $\geq 2$ μm to $\leq 7$ μm, for example from $\geq 3$ μm to $\leq 6$ μm, preferably in a range from $\geq 4$ μm to $\leq 5$ μm, for example of 4.5 μm, and/or that the talcum is present in the form of particles having a particle size $D_{98}$ in the range from ≥10 μm to ≤30 μm, preferably in a range from ≥15 μm to ≤20 μm, for example of 17 μm. The proportion of particles having a size of less than 2 μm may be 18%. In particular, such talcum particles offer the advantage that they allow a particularly gentle production of the carrier, since they can easily be embedded into the matrix material and thus exert no abrasive effect on pressing units used. In addition, by use of talcum particles in the specified particle size distributions carriers or panels with preferred mechanical properties can be produced.

To determine the particle size distribution well-known methods, such as laser diffractometry, can be used by means of which particle sizes in the range from a few nanometers up to several millimeters can be determined. By means of this method, moreover, the $D_{50}$ or $D_{98}$ values can be determined which respectively indicate, that 50% ($D_{50}$) and 98% ($D_{98}$), respectively, of the particles measured are smaller than the respective specified value.

It may further be advantageous that the matrix material comprises polypropylene, wherein the polypropylene comprises a blend of a homopolymer and a copolymer. Polypropylene is particularly suitable as a matrix material because on the one hand it is available at low cost and on the other hand as a thermoplastic material has good properties as a matrix material for embedding the solid material. In this case, in particular a blend of a homopolymer and a copolymer may enable particularly advantageous properties for the matrix material. Such materials also offer the advantage that in the method described above they can be molded into a carrier even at low temperatures, such as in a range from ≥180° C. to ≤200° C., such that a particularly effective process control, such as with exemplary line speeds in a range of 6 m/min, is possible.

As the copolymer, for example, a copolymer can be used which is composed of propylene and ethylene as monomer units, for example consists thereof.

The use of a homopolymer in particular enables a high melt flow rate, wherein the melt flow rate of the homopolymer may in particular be greater than that of the copolymer. This may enable a particularly good moldability of the carrier during the manufacturing process. Further, the homopolymer may thus allow a particularly good embedding of the solid material. Thus, it may be particularly advantageous if the homopolymer of polypropylene is one which has a melt mass flow rate (230° C., 2.16 kg) from ≥5 g/10 min, for example, ≥20 g/10 min, particularly preferably ≥50 g/10 min, for example up to ≤80 g/10 min. Here, the melt mass flow rate can be determined in accordance with ISO 1133.

Furthermore, it may be advantageous if the homopolymer has a tensile strength according to ISO 527-2 in a range from ≥30 MPa to ≤45 MPa, for example in a range from ≥35 MPa to ≤40 MPa, in order to achieve a good stability.

Moreover, in particular for a good stability it may be advantageous if the homopolymer has a flexural modulus according to ISO 178 in a range from ≥1000 MPa to ≤2200 MPa, for example in a range from ≥1300 MPa to ≤1900 MPa, such as in a range from ≥500 MPa to ≤1700 MPa.

With respect to the tensile strain of the homopolymer according to ISO 527-2 it may further be advantageous if it is in a range from ≥5% to ≤13%, for example in a range from ≥8% MPa to ≤10%.

For a particularly advantageous producibility, it may be provided that the Vicat softening temperature according to ISO 306/A for an injection-molded component is in a range from ≥130° C. to ≤170° C., for example in a range from ≥145° C. to ≤158° C.

The copolymer can serve in particular the mechanical strength of the carrier material or the carrier, since a copolymer often has a relatively high hardness in particular with respect to the homopolymer. Herein, it may be particularly advantageous, if the copolymer has a ball indentation hardness according to ISO 2039-1 from ≥15 MPa, for example ≥30 MPa, particularly preferably ≥40 MPa, such as ≥45 MPa, for example up to ≤65 MPa. In particular, the ball indentation hardness of the copolymer may be greater than that of the homopolymer.

It may be further particularly advantageous, if the copolymer of the polypropylene is one which has a melt mass flow rate from ≥4 g/10 min to ≤12 g/10 min, for example from ≥6 g/10 min to ≤9 g/10 min. Here, the melt mass-flow rate can be determined according to ISO 1183.

Furthermore, it may be particularly advantageous for a good stability if the copolymer has a tensile modulus according to ISO 527-1, -2 in a range from ≥900 MPa to ≤1400 MPa, for example in a range from ≥1100 MPa to ≤1250 MPa.

With regard to the tensile strength of the copolymer according to ISO 527-1, -2 it may further be advantageous if it is in a range from ≥15 MPa to ≤27 MPa, for example in a range from ≥18 MPa to ≤24 MPa. In particular, the tensile strength of the copolymer may be less than that of the homopolymer.

For an advantageous production process it may be further advantageous that the heat resistance, in particular the heat resistance B (0.45 MPa), non-annealed, in accordance with ISO 75B-1, -2, is in a range from ≥50° C. to ≤110° C., for example in a range from ≥70° C. to ≤90° C.

Thus, a particularly simple and good control of the properties of the matrix material and thus of the carrier material is already enabled within the matrix material. Such a control can thus be performed by simply selecting the corresponding homopolymers or copolymers and by selecting the corresponding proportions by weight.

With respect to the distribution of the homopolymer and the copolymer it may be preferred that the homopolymer, based on the polypropylene, is present in an amount from ≥10 wt.-% to ≤40 wt.-%, for example in an amount from ≥20 wt.-% to ≤30 wt.-%, such as in an amount from ≥23 wt.-% to ≤28 wt.-%, and/or that the copolymer, based on the polypropylene, is present in an amount of ≥60 wt.-% to ≤90 wt.-%, for example in an amount from ≥70 wt.-% to ≤80 wt.-%, such as in an amount from ≥72 wt.-% to ≤76 wt.-%, wherein the polypropylene in particular consists of the homopolymer and the copolymer. For example, the proportion of the homopolymer may be 26 wt.-% and the proportion of the copolymer may be 74 wt.-%. With such a configuration of the polypropylene particularly advantageous properties of polypropylene as a matrix material can be achieved. In detail, it was found surprisingly that in particular the above described proportions of the homopolymer or the copolymer combine a good processability with a good stability.

Furthermore, it may be preferred that the density of the copolymer is greater than or equal to the density of the homopolymer. Again, this feature can lead to a particularly preferred producibility in combination with particularly advantageous mechanical properties, especially a particularly good stability of a panel manufactured with the above-described carrier material. For example, the density of the homopolymer in accordance with ISO 1183 may be in a range from ≥0.85 g/cm³ to ≤0.95 g/cm³, for example from ≥0.89 g/cm³ to ≤0.91 g/cm³, such as 0.900 g/cm³. Furthermore, for example, the density of the copolymer according to ISO 1183 may be in a range from ≥0.86 g/cm³ to ≤0.96 g/cm³, for example from ≥0.895 g/cm³ to ≤0.915 g/cm³, such as 0.905 g/cm³.

Furthermore, it may be preferred that the matrix material comprises polyethylene in the form of LDPE (low density polyethylene). For example, the matrix material may be made of LDPE. Such materials offer the advantage that they can be formed into a carrier in the process described above already at low temperatures, such as in a range from ≥180° C. to ≤200° C., so that a particularly effective process control, such as with exemplary line speeds in a range of 6 m/min, can be achieved. In addition, LDPE is available at low cost and can further simplify the provision of the matrix material due to the fact that only a single homogeneous material, i.e. only one substance, is needed.

In particular, when the matrix material comprises LDPE, it can be provided that the matrix material is free of an adhesion promoter. This embodiment may enable that the carrier material is particularly inexpensive, because a component can be dispensed with that should be added to the matrix material depending on the polymer used in the matrix material. In addition, the provision of the carrier material can be further simplified.

It can further be provided that the carrier material consists of at least one polymeric plastic as a matrix material, talcum and optionally an adhesion promoter. In particular, in this embodiment, a production can be particularly cost-effective and the process control can be particularly easy, because the carrier material consists only of talcum, a polymeric matrix which may for example consist of a homogeneous plastic material, and in particular depending on the plastic used an adhesion promoter which can be selected with respect to the plastic in a manner known per se.

It may also be advantageous that the solid material in addition to talcum comprises at least one further solid. This embodiment in particular allows the weight of the carrier material or a panel formed with the carrier material to be reduced significantly compared with a carrier material or a panel in which the solid material consists of talcum. Thus, the solid added to the solid material may have in particular a density which is reduced compared with talcum. For example, the added material may have a bulk density in a range of ≤2000 kg/m³, in particular ≤1500 kg/m³, for example ≤1000 kg/m³, particularly preferably ≤500 kg/m³. Herein, depending on the added solid, moreover, a further adaptability to the desired, in particular mechanical properties, can be obtained.

As an example, the further solid can be selected from the group consisting of wood, for example in the form of wood flour, expanded clay, volcanic ash, pumice, cellular concrete, in particular inorganic foams, cellulose. With respect to cellular concrete, this may be, for example, the solid used by the company Xella under the brand name Ytong which consists essentially of quartz sand, lime and cement, or the cellular concrete may comprise the aforementioned components. With respect to the added solid this, for example, can be composed of particles having the same particle size or particle size distribution as the particle sizes or particle size distributions described above for talcum. The further solids may be present in particular in a proportion in the solid material in a range of <50 wt.-%, in particular <20 wt.-%, for example <10 wt.-% or <5 wt.-%.

Alternatively, it may be provided, for example for wood, in particular for wood flour, that its particle size is between >0 μm and ≤600 μm with a preferred particle size distribution of $D_{50} \geq 400$ μm.

Furthermore, the carrier material may comprise between ≥0 wt.-% and ≤10 wt.-% of further additives such as flowing agents, heat stabilizers or UV stabilizers.

For example, the carrier material may be present as a granulate and in this case may have an approximately cylindrical shape. Furthermore, regardless of the shape but by way of example in a cylindrical form, the granular particles may have a diameter in a range from ≥2 mm to ≤3 mm, such as 2 mm or 3 mm, and a length from ≥2 mm to ≤9 mm, for example from ≥2 mm to ≤7 mm or ≥5 mm to ≤9 mm.

In summary, the above-described carrier material thus offers the advantage of a good producibility in combination with a high dimensional stability, in particular with regard to moisture and temperature influence, as well as good mechanical properties.

With regard to further technical features and advantages of the above-described carrier material it is hereby explicitly referred to the description of the panel, the method and the figures.

The present disclosure further relates to a decorated panel, in particular a decorated wall or floor panel, comprising a carrier and a decoration applied onto the carrier, wherein in particular a top layer provided with a structure is applied onto the decoration. Such a panel is characterized in that the carrier comprises a carrier material as described in detail above. With reference to the specific features it is thus referred to the above description.

Moreover, the edge regions of the panel can be structured or profiled in order to provide in particular detachable connecting elements. In this regard, in a profiling in the sense of the disclosure it may be provided that at least in a part of the edges of the decorative panel a decorative and/or functional profile is formed by means of suitable material removing tools. Herein, a functional profile means for example the formation of a groove and/or tongue profile in an edge in order to make decorative panels connectable to each other by means of the formed profiles. Here, in particular with groove and/or tongue profiles, elastic materials are of advantage since by means of these alone such profiles can be produced, which are particularly easy to handle and stable. Thus, in particularly no further materials are necessary to produce the connecting elements.

In summary, the above-described panel can provide the advantage of a high dimensional stability with respect to heat and moisture influence with simultaneously good mechanical properties. Furthermore, such a panel can be very stable and at the same time have a high elasticity, which may in particular of advantage for an effective and cost-efficient design of connecting elements at the edge region of the carrier and further with respect to an impact sound insulation.

With regard to further technical features and advantages of the panel it is hereby explicitly referred to the description of the carrier material, the method and the figures.

By means of the disclosure, moreover, a method for producing a decorated wall or floor panel is proposed, comprising the steps of:
  a) providing a pourable carrier material, in particular a granulate, wherein the carrier material is configured as described above in detail,
  b) placing the carrier material between two belt-like conveying means, c) molding the carrier material under the action of heat to form a web-shaped carrier,
d) compressing the carrier,
e) treating the carrier under the action of pressure by use of a twin belt press,
f) optionally cooling the carrier,
g) optionally applying a decoration subsurface onto at least a portion of the carrier,
h) optionally applying a decoration simulating a decorative template onto at least a portion of the carrier, and
i) optionally applying a protective layer onto at least a portion of the decoration.

Furthermore, the following steps may follow:
j) patterning of the protective layer, and
k) treating the carrier for electrostatic discharge and optionally for electrostatic charge prior to at least one of the aforementioned steps, in particular prior to one of the steps d) to i), such as prior to process step h).

It could surprisingly be shown that the method described above enables a particularly advantageous production in particular of a carrier of a wall or floor panel. In this case, the method can be particularly advantageous by use of the carrier material as described in detail above.

It has in particular been found that by the method described herein it is enabled to obtain a particularly smooth and defined adjustable surface of the carrier which can be particularly of advantage, for example, for further processing into a panel, in particular in the application of a decoration, for instance by direct pressure.

First, a carrier or a core is produced in accordance with the present method. To this end, the method described above comprises at first according to step a) providing a pourable carrier material. The carrier material serves as a basis for the production of in particular plate-shaped carriers for panels. In this regard, reference is made entirely to the foregoing remarks.

In a particularly advantageous manner the carrier material can be provided as a pourable solid or as a granulate, wherein the granulate merely by way of example may have a grain size in a range from ≥100 µm to ≤10 mm depending on the material used. A preferred filling or distribution of the carrier material may in this case include a deviation of the bulk density of ≤5%, in particular ≤3%.

According to step b) the pourable, in particular granular carrier material is disposed between two belt-like conveyors. In detail, a lower belt-like conveying means is moved circumferentially and in a defined distance to the lower conveying means an upper belt-like conveying means is moved circumferentially. Thus, the carrier material may be applied onto the lower conveying means and then constrained by the lower and the upper conveying means. Here, by means of an exact scattering a lateral boundary can be dispensed with. By means of the two conveying means the carrier material can thus be carried to or through individual processing stations and processed into a carrier. Furthermore, the carrier material can already be pre-formed in this step. Thus, the belt-like conveying means may have two functions, namely that of a transport means and that of a mold.

The belt-like conveying means at least in the region of the twin belt press may, as described below, at least partially be made of Teflon or polytetrafluoroethylene (PTFE). For example, the belts can be formed entirely of polytetrafluoroethylene, or belts may be used which are provided with an outer layer of polytetrafluoroethylene. In the latter case, for example, glass fiber reinforced plastic belts or steel belts comprising a coating of polytetrafluoroethylene can be used.

By this kind of conveying means due to the anti-adhesion properties of this material a particularly defined, for example, smooth surface of the produced carrier may be obtained. Thus, it can be prevented that the conveyed carrier material adheres to the conveying means and thus adversely affects the surface structure directly or by adherent material in a next cycle. In addition, polytetrafluorethylen is even at high temperatures resistant against chemicals as well as against decomposition, so that on the one hand a temperature treatment of the carrier material is possible without any problems and on the other hand the conveying means are also stable for a long period. In addition, the material may be freely selected.

Herein, the conveying means may pass through the entire apparatus or may be interrupted and configured as a plurality of conveying means.

The application of the carrier material according to method step b) may in particular be realized by means of a plurality of scattering heads, which are adapted to dispense the carrier material in a defined way, for example from storage containers. In this case, a doctor blade may further be provided which sweeps the material into recesses of the roller. Subsequently the material can be dispensed from the scattering roller by use of a rotating brush roller, such that it hits against a baffle and slides from there onto the conveying means. In order to control the scattering width further a scattering width adjustment may be provided. In this embodiment, a particularly homogeneous dispense of the carrier material may be realized, which accordingly leads to a homogeneous carrier of defined quality.

For example, one scattering head or two, three or more scattering heads may be provided. As a result, the carrier can be tailored in a particularly simple way, for example by providing a desired mixture of materials. In this embodiment, the mixture can be easily adjusted during the production process or between two charges such that a particularly great variability can be ensured. In addition, by equipping the individual scattering heads differently a mixture for the carrier material may be produced only immediately prior to the processing such that a mutually adverse influence of the various components and a resulting reduction in quality of the produced carrier can be prevented.

For example, a sensor for checking the placement of the carrier material between the two belt-like conveying means, for example with respect to the area density of the applied material or the homogeneity, may be provided.

In a further step according to step c) the carrier material arranged between the belt-like conveying means is molded under the influence of temperature or heat. In this step due to thermal energy or heat applied the carrier material or at least a part thereof is melted or softened, whereby, for example, the granulate may become moldable. In this state it may homogeneously fill the receiving space formed between the conveying means and thus form a web-shaped carrier, which can be further treated.

The thus formed web-shaped carrier can be compressed simultaneously with or subsequently to step c) according step d). This step may be implemented in particular in a suitable press or roller. Thus, here a first compression of the web-shaped carrier takes place. In this step, the carrier can substantially already obtain a desired thickness such that in following processing steps only a slight compression needs to be carried out and thus the further steps may be implemented very gently, as will be explained in detail below. Herein, in particular, it can be ensured that the temperature of the carrier is cooled down sufficiently such that a suitable compressibility is enabled while achieving the desired result.

In a further step e) now a further treatment of the carrier under the influence of pressure with use of a twin belt press is implemented. In this step in particular the surface properties of the carrier can be adjusted or the thickness of the carrier can at least substantially be pre-adjusted. To this end, the previously compressed carrier can be treated under the influence of pressure, wherein in particular a low pressure can be selected such that this compression takes place only in a very small range. Thus, the design of the processing device in this step can be selected in particular depending on a desired adjustment of the compression, which may be particularly gentle and effective.

Here, in particular the use of a twin belt press can be advantageous, since with such a press particularly gentle compression steps are possible and moreover the surface quality or the thickness of the carrier can be set particularly effective and defined. Furthermore, the use of a belt press in particular enables high line speeds such that the whole process enables a particular high throughput. Moreover, for example, by providing pneumatic cylinders a particularly uniform and defined adjustable belt tension of the twin belt press can be enabled.

Herein, smoothing or adjusting the surface quality in this step may mean that, while the uppermost surface is smoothed, already introduced structures or pores, however, are not influenced or are only influenced in a defined region, so that these even after this step may be present as desired, if required. This can be enabled in particular by the use of a belt press with a suitable temperature profile and with suitable pressure values, or by means of a calender, as described in detail below.

In particular, in heating of the carrier or the carrier material in preceding steps, it may be preferably provided that the carrier is cooled during or prior to step e), in particular below the melting point or the softening point of a plastic component of the carrier material. In other words, the carrier may be cooled prior to or within the twin belt press. In this case, cooling can be implemented only in a limited range, so that the carrier still has an elevated temperature compared to room temperature (22° C.) but is below the preset elevated temperature and preferably and depending on the plastic material used below the melting point or the softening point of the plastic included in the carrier material. In particular, by cooling the carrier cupping or the occurrence of blowholes or pores can be avoided such that the surface of the carrier can be of particularly high quality. Suitable temperatures for polyethylene, for example, are in a range of below 130° C., in particular below 120° C., such as in a range from ≥80° C. to ≤115° C., without being restricted thereto.

With respect to the compression of the carrier in the twin belt press, it may be provided that step e) is realized by establishing a compression factor K1 of the carrier. A compression factor K in particular means a factor by which the thickness of the carrier is reduced in the treatment step. Thus, at an original thickness of the carrier prior to a treatment of 5 mm and a thickness of the carrier after the treatment of 4 mm a thickness of 80% with respect to the thickness prior to the treatment is provided, i.e. the thickness was reduced by 20%. Accordingly, the compression factor K1 is 0.2.

Exemplary compression factors for step e) are for example in a range of >0, for example ≥0.1 to ≤0.3, such as ≥0.15 to ≤0.25.

The above-described treatment of the carrier in step e) is implemented at a temperature T1. This temperature may for example be in a range from ≥150° C. to ≤190° C., for example from ≥160° C. to ≤180° C., for example 170° C. Due to the fact that the carrier comprises a plastic component, the carrier is comparatively soft in this temperature range and, therefore, moldable in particular over its entire thickness, so that a compression can be conducted particularly effectively even by use of low contact pressures of the twin belt press. This step can thus serve in particular a setting or calibration of the thickness of the carrier.

Optionally, according to the above-described step e) a further treatment of the carrier can be performed under the influence of pressure at a temperature T2 under formation of a compression factor K2 of the carrier, wherein T2<T1, and wherein K2<K1. In this case, the temperatures T1 and T2 relate in particular to the temperature acting on the carrier, so that it is possible that the carrier does not necessarily have the same temperature or does not necessarily have the same temperature over its entire thickness. This step therefore comprises a further treatment process of the carrier under the application of pressure, which for example, without being limited thereto, can immediately follow step e). In particular, the temperature T2 is preferably not adjusted merely by cooling during the treatment of the carrier by the lack of heating, but rather by the defined action of a respective tempering means, such as by means of active cooling by use of a respective tempering means.

The temperature T2 during step f) may enable, for example, by use of a carrier that the viscosity of the carrier is lower or the carrier is harder than at the temperature T1 used in step e).

This step f) may thus serve in particular not to compress the carrier significantly or reduce the thickness of the carrier, but rather to adjust the surface properties of the carrier and thus mainly to smoothen the carrier or its surface.

For example, without being limited thereto, in this step a compression can be carried out which can be in a range of in particular >0%, which, however, may be limited to values in a range of ≤20%, wherein the carrier, thus, subsequently has a thickness of 80% with respect to its thickness prior to step f). Thus, the compression factor K2 is less than the compression factor K1. Exemplary compression factors are in a range from >0 to ≤0.2, such as in a range from >0.03 to ≤0.15 or >0.05 to ≤0.12, exemplarily at 0.1.

In a post smoothing process, for example, a temperature can be set, which is above the crystallization temperature of the plastic material. In the case of linear polyethylene (LLDPE) as a component of the carrier, for example, a heating to a temperature in a range from ≥100° C. to ≤150° C., for example 120° C., can be sufficient and appropriate. In principle, therefore, the temperature T2 can be set such that it, for example, is in a range from ≥100° C. to ≤150° C., such as at 120° C.

By means of the above-described multi-stage compression process a very accurate and homogeneous thickness can be achieved in particular for panel carrier materials and, moreover, a particularly high surface quality can be achieved.

The post smoothing process can be carried out, for example, in the two-belt press by setting a temperature gradient along the conveying direction of the carrier. Alternatively, it may be provided that step e) and the post smoothing process described above are carried out in two separate pressing means. To this end, for example, a further twin belt press or a calender can be used for the post smoothing process. In the event that, for example, a twin belt press is used, this may in particular comprise a metal belt, such as, for example, a steel belt, in step f) in order to achieve a suitable compression pressure even in the chosen temperature range. Here, in step e) a plastic belt may be sufficient due to the relatively higher temperature.

In a further preferred embodiment it can be provided that the carrier is cooled down between steps e) and f) to a temperature T3, wherein T3<T1, and wherein T3<T2. In a further preferred embodiment it can be provided that the carrier) prior to or during process step f) is heated to a temperature which is above the crystallization temperature of a plastic material included in the carrier.

In the further course in a further step g) subsequently optionally a cooling of the web-shaped carrier is carried out. The carrier may be cooled in particular by providing a cooling means with defined cooling stages to a temperature which corresponds to the room temperature or merely by way of example in a range of up to about 20° C. thereabove. For example, a plurality of cooling zones may be provided in order to enable a defined cooling of the carrier.

Moreover, it may be provided that the carrier is heated after step f), in particular immediately after step f) and/or for example prior to the application of additional layers to a temperature above the crystallization temperature of one, for example of all, plastic materials present in the carrier. Then, the carrier can again be cooled down below the crystallization temperature, for example to room temperature (22° C.). In particular, when the carrier after the treatment of the carrier after step f), and in particular after a cooling of the carrier after process step f) is reheated to a temperature above the crystallization temperature of the plastic material included in the carrier material, the properties of the carrier can be further improved. For example, the carrier may have improved stability properties, in particular in terms of its mechanical and/or thermal and/or chemical resistance. Thus, the quality of the carrier can be further improved.

Here, the crystallization temperature in the sense of the present disclosure is in particular a temperature to which the polymer must be heated in order to subsequently form crystals during the cooling process. In particular, the crystal formation starts during a cooling of the polymer at a temperature which may be below the melting temperature and possibly above the glass transition temperature. Accordingly, a heating to a temperature below the melting temperature of the respective plastic material or to a temperature below the melting temperature may be sufficient. In the case of linear polyethylene (LLDPE), for example, heating to a temperature in a range from ≥100° C. to ≤150° C., for example 120° C., may be sufficient. In the case of polypropylene, for example, heating to a temperature in a range from ≥160° C. to ≤200° C., for example, 180° C., may be sufficient.

Thus, the duration of the corresponding heating process in a manner obvious to those skilled in the art may be dependent on the speed of travel of the carrier, its thickness and the temperature to be set.

After a cooling of the carrier produced, the carrier can initially be stored as an intermediate product in a web-shaped form or as individual plate-like carriers and the method may momentarily be finished. Preferably, however, further treatment steps follow, which may, for example, be realized without a grinding process, in particular in order to process the carrier provided so as to produce a finished panel, as is explained in detail below.

In order to produce a finished panel, the method may comprise the following further steps to provide the carrier with a decoration and to coat it with a protective layer. Here, the following steps are preferably carried out immediately with the produced web-shaped carrier. However, it is also encompassed by the disclosure that the web-shaped carrier is first divided in a plurality of plate-shaped carriers prior to an appropriate one of the steps g) to i) and/or the plate-shaped carrier is further treated by the corresponding following process steps. The following explanations apply to both alternatives correspondingly, wherein for an easy understanding in the following reference is made to a treatment of the carrier.

It is also possible, if appropriate, to initially carry out a pretreatment of the carrier for electrostatic discharge for example prior to method step h) and optionally a subsequent electrostatic charging. This may in particular serve to avoid the occurrence of blurring in the course of the application of the decoration.

According to method step g) further optionally a decoration subsurface may be applied onto at least a portion of the carrier. For example, first a primer in particular for printing processes may be applied as a decoration subsurface for example in a thickness of ≥10 µm to ≤60 µm. In this case, as a primer a liquid radiation curable mixture based on a urethane or a urethane acrylate, optionally with one or more of a photoinitiator, a reactive diluent, a UV stabilizer, a rheological agent such as a thickener, radical scavengers, leveling agents, antifoams or preservatives, pigment, and/or a dye may be used.

In addition to the use of a primer it is possible to apply the decoration onto a decorative paper printable with a corresponding decoration, which may be provided for example by means of a resin layer as bonding agent previously applied to the carrier. Such a printing subsurface is suitable for flexographic printing, offset printing or screen printing processes and in particular for digital printing techniques such as inkjet processes or laser printing processes. For the application of the resin layer it may be preferably provided that a resin composition is applied which as a resin component includes at least one compound selected from the group consisting of melamine resin, formaldehyde resin, urea resin, phenol resin, epoxy resin, unsaturated polyester resin, diallyl phthalate or mixtures thereof. The resin composition may, for example, be applied at a coverage between ≥5 g/m² and ≤40 g/m², preferably ≥10 g/m² and ≤30 g/m². Further, a paper or a non-woven fabric with a grammage between ≥30 g/m² and ≤80 g/m², preferably between ≥40 g/m² and ≤70 g/m² may be applied onto the plate-shaped carrier.

Furthermore, according to method step h) a decoration reproducing a decorative template may be applied on at least a portion of the carrier. In this case, the decoration may be applied by so-called direct printing. The term "direct printing" in the sense of the disclosure means the application of a decoration directly onto the carrier of a panel or onto an unprinted fiber material layer applied to the carrier or a decoration subsurface. Here, different printing techniques such as flexographic printing, offset printing or screen printing may be used. In particular digital printing techniques such as inkjet processes or laser printing processes can be used.

The decorative layers may be formed of an in particular radiation curable paint and/or ink. For example, a UV-curable paint or ink can be used.

Herein, the decorative layers may respectively be applied in a thickness in a range from ≥5 µm to ≤10 µm.

It can also be provided to apply in addition to a positive image with regard to the color and/or texture also a corresponding negative image of the decorative template. In detail, as is known, for example, from positive staining or negative staining of wood-based materials the color impression for example of a grain can be reversed by the use of digital data, such that a negative is obtained with respect to the color or in particular lighter and darker areas. In addition to the color impression corresponding results can also be obtained for the applied structure, such that also with respect to the structural design a negative can be realized. Even such effects can be integrated easily based on digital three-dimensional data and without lead-time or refittings in a manufacturing process.

According to method step i) a protective layer can be applied onto at least a portion of the decoration. Such a layer for protecting the applied decoration can in particular be applied as a wearing or top layer on top of the decorative layer in a subsequent step which in particular protects the decorative layer from wear or damage caused by dirt, moisture or mechanical impacts, such as abrasion. For example, it may be provided that the wearing and/or top layer is laid as a pre-produced overlay layer, such as based on melamine, onto the printed carrier and bonded to it by pressure and/or heat impact. Moreover, it may be preferred that for the formation of the wear and/or top layer also a radiation curable composition, such as a radiation curable lacquer, e.g. an acrylic lacquer, is applied. Herein, it may be provided that the wearing layer includes hard materials such as titanium nitride, titanium carbide, silicon nitride, silicon carbide, boron carbide, tungsten carbide, tantalum carbide, alumina (corundum), zirconia or mixtures thereof in order to increase the wear resistance of the layer. In this case, the application can be realized for example by means of rollers, such as rubber rollers, or pouring devices.

Furthermore, the top layer can be initially partially cured and subsequently a final coating process with a urethane acrylate and a final curing process, such as by use of a gallium emitter, may be carried out.

Moreover, the top and/or the wearing layer may include agents for reducing the static (electrostatic) charging of the finished laminate. To this end, for example, it may be provided that the top and/or wearing layer comprise compounds such as choline chloride. The antistatic agent may, for example, be contained in a concentration between ≥0.1 wt.-% and ≤40.0 wt.-%, preferably between ≥1.0 wt.-% and ≤30.0 wt.-% in the composition for forming the top and/or wearing layer.

Moreover, it can be provided that in the protective layer or in the wearing or top layer a structuring, in particular a surface structure matching with the decoration is formed by introducing pores. Herein, it may be provided that the carrier plate already has a structure and an alignment of a printing tool for applying the decoration and the carrier plate relative to each other is carried out depending on the structure of the carrier plate detected by optical methods. For aligning the printing tool and the carrier plate relative to each other it may be provided that a relative movement between the printing tool and the carrier plate necessary for the alignment process is carried out by a displacement of the carrier plate or by a displacement of the printing tool. Furthermore, it may be provided that a structuring of the decorative panels is implemented after the application of the top and/or wearing layer. For this purpose, it may be preferably provided that as a top and/or wearing layer a curable composition is applied and a curing process is carried out only to the extent that only a partial curing of the top and/or wearing layer occurs. In the thus partially cured layer a desired surface structure is embossed by means of suitable tools, such as a hard metal structure roller or a die. Herein, the embossing process is carried out in accordance with the applied decoration. In order to ensure a sufficient matching of the structure to be introduced with the decoration it may be provided that the carrier plate and the embossing tool are aligned relative to each other by corresponding relative movements. Subsequently to the introduction of the desired structure into the partially cured top and/or wearing layer a further curing process of the now structured top and/or wearing layer is carried out.

In addition, a backing layer may be applied onto the side opposite to the decorative side.

The method described above enables the production of a panel with a carrier having a particularly high moisture and temperature resistance.

In a further preferred embodiment, it may be provided that prior to step e) an anti-adhesive means is arranged such that at least in the twin belt press it is disposed between the carrier and a conveying means, such as the upper or the lower conveying means, preferably between the carrier and both conveying means. In this embodiment, an adhesion of the carrier to a conveying means can particularly effective be prevented. The anti-adhesive means may, for example, be rolled up on a first roll and be fed together with the carrier through the twin belt press and optionally the further pressing unit, such as the calender, before being rolled up onto another roll. Preferably there is no relative velocity between the anti-adhesive means and the carrier. In other words, the anti-adhesive means preferably moves with the same velocity as the carrier. For example, the anti-adhesive means may comprise a release paper, such as an oil paper. An oil paper, also referred to as wax paper, in a manner known per se means for example a wood-free paper which comprises an organic substance, for example an oil or wax or paraffin, for example is impregnated therewith.

According to a further embodiment step d) may be performed by use of an S-roller. By use of an S-roller as a compression unit a desired compression is possible in a defined way with simple and inexpensive means even at high line speeds. In order to be able to set the corresponding and depending on the desired result appropriate force the roller can be shiftable, for example, in the direction perpendicular to the passing carrier material. Herein, the S-roller may, for example, comprise only a single roller, which exerts a force only in combination with a counter force generated by the belt tension of the conveying means. Alternatively, one or a plurality of counter rollers may be provided, which apply the corresponding counter force.

An S-roller in the sense of the disclosure means a roller which is arranged such that the carrier passes it in an S-shaped path as is well known to those skilled in the art and is described in detail below with reference to the figures.

Furthermore, optionally a temperature gradient can be set in the twin belt press. This can be achieved, in particular, by a temperature gradient in a direction perpendicular to the conveying direction. In this embodiment, a particularly high line speed can be enabled since a particularly fast heating can be achieved which allows such a high line speed. Herein, moreover, an excessively high temperature effect on the carrier material can be prevented which can prevent damages and enable a particularly high quality. In addition, degassing upon heating of the carrier material can be improved and accelerated which in turn allows a high line speed and further enables a particularly high stability and quality by preventing gas inclusions. In the latter case, in particular, the region below the carrier material can be heated to a higher temperature than the region above the carrier material, i.e. a lower tempering element may have a higher temperature than an upper tempering element. For example, here a temperature gradient in a range of 50° C. can be advantageous.

Regarding further technical features and advantages of the method described above it is hereby explicitly referred to the description of the carrier material and the panel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The disclosure is further explained below with reference to the Figures and an exemplary embodiment.

Figure 2:
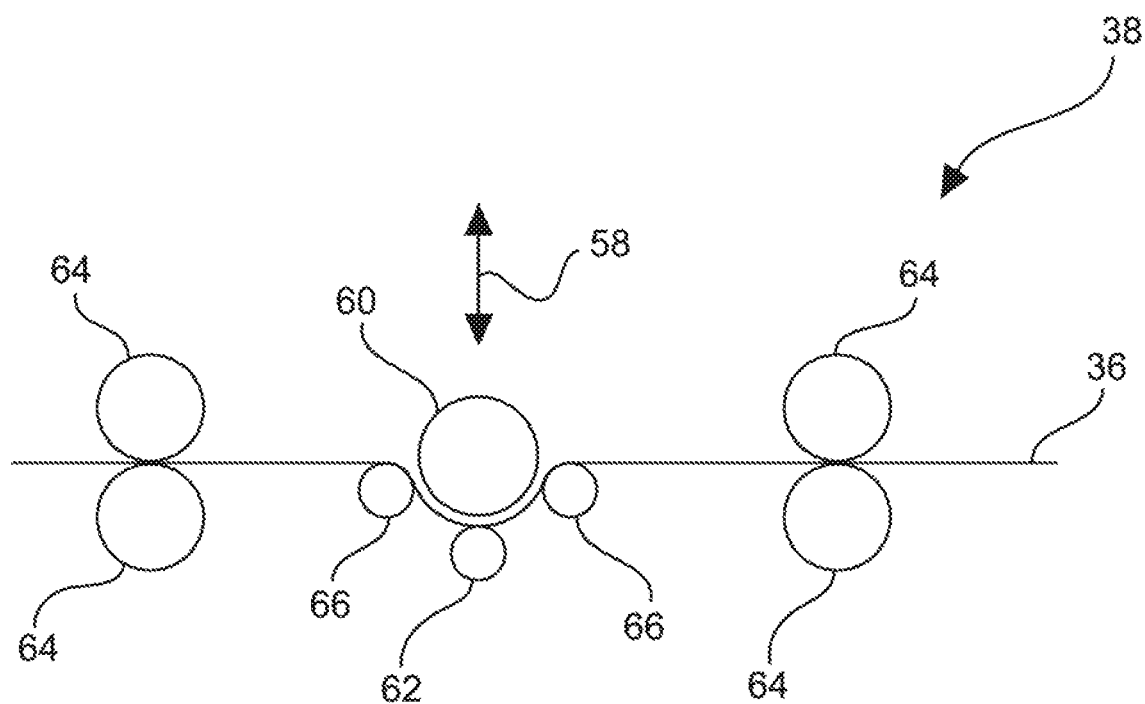

FIG. 1 schematically shows an embodiment of a device according to the disclosure for performing a part of the method according to the disclosure; and FIG. 2 shows an exemplary S-roller for performing a step of the method according to the disclosure.

Corresponding reference numerals indicate corresponding parts throughout the several views of the drawings.

DETAILED DESCRIPTION

Example embodiments will now be described more fully with reference to the accompanying drawings.

The device 10 of FIG. 1 is adapted for a method for producing a decorated wall or floor panel. Herein, with reference to FIG. 1 in particular processing stations for the following steps are described:
  a) providing a pourable carrier material 20, in particular a granulate,
  b) placing the carrier material 20 between two belt-like conveying means 12, 14,
  c) molding the carrier material 20 under the action of heat to form a web-shaped carrier 36,
  d) compressing the carrier 36,
  e) treating the support 36 under the action of temperature and pressure, in particular by use of a twin belt press,
  f) optionally cooling the carrier 36, The device 10 according to FIG. 1 first of all comprises two circumferential belt-like conveying means 12, 14, which in particular are passed through guide rollers 16 such that between them a receiving space 18 for receiving and processing a provided pourable, in particular granular carrier material 20 is formed. The carrier material 20 comprises i) a matrix material including a plastic material and ii) a solid material, wherein the solid material consists of talcum to at least 50 wt.-%, in particular at least 80 wt.-%, in particular at least 95 wt.-%, based on the solid material, wherein the matrix material, based on the carrier material, is present in an amount from ≥30 wt.-% to ≤70 wt.-%, in particular ≥40 wt.-% to ≤60 wt.-%, and wherein the solid material, based on the carrier material, is present in an amount from ≥30 wt.-% to ≤70 wt.-%, in particular ≥40 wt.-% to ≤60 wt.-%, and wherein the carrier material and the solid material, based on the carrier material 20, in common are present in an amount of ≥95 wt.-%, in particular ≥99 wt.-%.

In particular, the carrier material 20 may further be provided by use of a kneader mixer, in which the starting materials are mixed and conveyed by means of a worm and thus are pressed through a perforated plate and cut in small particles, for example, by means of an angled cutter, so as to obtain a granulate material.

The conveying means 12, 14 may be at least partially constructed of polytetrafluoroethylene, for example, be coated therewith. Furthermore, the conveying means 12, 14 may at least partially be roughened or structured in particular on their side facing the receiving space 18. Moreover, the conveying means 12, 14 may have a width in a range of about 1.5 m.

In order to apply the carrier material 20 between the belt-like conveying means 12, 14 or in the receiving space 18, a discharge unit 22 with one or a plurality of discharge heads 24 is provided, by means of which the carrier material 20 can be placed on the lower conveying means 14. The discharge heads 24 can comprise a funnel 25 which applies the carrier material 20 onto corresponding scattering rollers 26, whereupon the carrier material 20 can be scattered onto the lower conveying means 14.

In order to ensure a homogeneous application of the carrier material 20 onto the lower conveying means 14 a sensor for checking the placement of the carrier material 20 between the two belt-like conveying means 12, 14 may be provided. The sensor can in particular be coupled with the discharge unit 22 in order to immediately correct a potentially inaccurate filling of the receiving space 18.

In order to enable a homogeneous distribution of the carrier material 20, moreover, vibrators may be provided. These may, for example, act on the lower conveying means 14 and may be arranged, for example, below the lower conveying means 14, such that the carrier material 20 is finely distributed.

In order to prevent an unwanted contamination and a damage of downstream processing stations, moreover a sensor for detecting metals can be provided, which is able to detect inadvertently introduced metal.

Furthermore, a molding unit 28 is provided in the conveying direction of the conveying means 12, 14, which is indicated by the arrow 13, wherein the molding unit is adapted to mold the carrier material 20 under the action of temperature or heat to fuse the carrier material 20 in order to form a web-shaped carrier 36. For this purpose, the molding unit 28 may have two plate-like molding means 30, 32 which can be heated by one or a plurality of heating means 34, for example by means of a thermal oil. As a result, the carrier material 20 can be heated until, for example depending on the melting point of the carrier material 20 or a portion thereof, it has reached a temperature, for example and depending on the material used, from ≥180° to ≤200° C. To this end, the molding unit 28 or the molding means 30, 32 can be heated, for example, to a temperature of up to 250° C. To this end, for example, one or for setting a temperature gradient a plurality of independently adjustable heating sections can be provided. For example, the entire molding means 30, 32 which may have a length of several meters, can be heatable, or only a part thereof can be heatable.

Furthermore, the molding unit 28 can in particular comprise a parallel gap which can be formed by the plate-like molding means 30, 32. In this case, however, at the inlet an inlet mouth can be provided by a conical form in order to allow an improved inflow of the carrier material 20. The force acting on the carrier material 20 may here be in a range of >0 kg/m² up to ≤1 kg/m². In this manner, in particular a uniform pressurization can be provided without the provision of a pressure profile or a pressure gradient.

In FIG. 1 it can also be seen that the lower molding means 32 is longer than the upper molding means 30 and also starts before the upper one. Thereby it can be achieved that a processing takes place only when the carrier material 20 is already molten or is at least partially molten and at least partially softened. This enables a particularly defined shaping process.

In the further course in the conveying direction of the conveying units 12, 14 the web-shaped carrier 36 is fed through a pressing means 38. The pressing means 38 can, for example, include an S-roller, which is shown in detail in FIG. 2. The S-roller may be displaceable substantially perpendicular to the surface of the carrier 36 and thus to the travel direction of the carrier 36, as indicated by the arrow 58, so that the desired pressures can be particularly advantageously be adjustable. Furthermore, the pressing means 38 can for example apply a pressure onto the carrier 36 in a range of $\geq 1$ kg/m$^2$ to $\leq 3$ kg/m$^2$. The S-roller comprises a main roller 60 which acts on the web-shaped carrier 36. Here, in some circumstances the belt tension may be sufficient as counter-pressure, however, it is preferred that at least one counter-pressure roller 62 is provided. For a suitable guidance of the web-shaped carrier 36, moreover, two pairs of calender rollers 64 and optionally deflection rollers 66 may be provided which may provide a suitable belt tension. In FIG. 2 it can be seen that the web-shaped carrier 36 is fed twice in an S-shaped manner around the deflection rollers 66 and the main roller 60, and it is this type of guidance that specifies the term S-roller. In detail, the web-shaped carrier 36 can be wound around the main roller 60 over a range of approximately 50% or more. The temperature of the carrier 36 at the entry into the pressing means 38 corresponds in particular to the temperature present at the exit of the molding unit 28.

From the pressing means 38 the carrier 36 is subsequently fed to a further pressing means 40. In order to compensate any heat loss of the carrier 36 or to intentionally heat the carrier 36 further or to cool the carrier 36 one or a plurality of further tempering means 42 can be provided between the pressing means 38, 40.

Returning to the pressing means 40, this can advantageously be a twin belt press which in particular may comprise steel belts 44, 46, wherein the belts 44, 46 of the twin belt press may be guided by deflection rollers 48, 50. The deflection rollers 48, 50 can, for example, be heated, for example by means of a thermal oil heating and/or the rollers on the same side of the gap may be disposed at a distance in a range from $\geq 1$ m to $\leq 2$ m, for example 1.5 m, from each other, wherein the belts 44, 46 may have a width in a range of about 1.5 m. According to FIG. 1, the carrier 36 disposed between the conveying means 12, 14 is guided between the deflection rollers 48, 50 and thus between the belts 44, 46, such as in particular steel belts. On the side of the belts 44, 46 opposite to the carrier 36 respective pressing and/or heating means 52, 54 are provided. These can both heat and slightly compress the conveying means 12, 14 and thus the carrier 36. For this purpose, for example, an air-heating can be provided and a plurality of rollers, which may enable an intermittent pressing. Here, a temperature in a range of up to 250° C. may act on the carrier 36. For example, the temperature may be in a range of $\geq 25°$ C. to $\leq 35°$ C. above the melting temperature or softening temperature of the carrier material or a portion thereof. Furthermore, a pressure may act on the carrier 36 such that the carrier 36 is compressed in step e) by a factor of $\leq 7.5\%$, preferably $\leq 5\%$, for example in a range from $\geq 0.1$ mm to $\leq 0.2$ mm. Here, the pressing and/or heating means 52, 54 can substantially occupy the entire region between the deflecting rollers 48, 50 or only a limited area along the conveying direction.

After passing through the pressing means 40, the carrier may have a temperature in a range of 190° C.

Here, the pressing means 40 may have a varying pressure profile, for example starting with 6 mm and ending with 4.1 mm, or advantageously be configured as an isochoric press.

In the conveying direction downstream of the pressing means 40 according to FIG. 1 a cooling means 56 is arranged by means of which the carrier can be cooled down to a temperature which is, for example, in a range of $\leq 35°$ C. Here, the cooling means 56 may for example be based on water cooling and can comprise a plurality of cooling zones in order to allow a defined cooling by use of exactly adjustable cooling programs. The length of the cooling zone can correspond to the effective length of the pressing means 40. Downstream of the cooling means 56, for example, another cooling belt may be provided.

After these process steps the carrier 36 which may have a final thickness in a range from $\geq 3$ mm to $\leq 5$ mm, for example 4.1 mm, may be directly further processed or stored, such as a web-shaped carrier 36 or as an already separated plate-shaped carrier 36.

At this point, the further steps may follow:
g) optionally applying a decorative subsurface onto at least a portion of the carrier 36,
h) applying a decoration simulating a decorative template onto at least a portion of the carrier 36, and
i) applying a protective layer onto at least a portion of the decoration.
j) optionally patterning the protective layer, and
k) optionally treating the carrier 36 for electrostatic discharge prior to one of the aforementioned steps.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A carrier material for producing a carrier for a decorated wall or floor panel, wherein the carrier material comprises i) a matrix material including a plastic material and ii) a solid material, wherein the solid material comprises talcum to at least 50 wt.-%, wherein the matrix material is present in the carrier material in an amount from $\geq 30$ wt.-% to $\leq 70$ wt.-%, and wherein the solid material is present in the carrier material in an amount from $\geq 30$ wt.-% to $\leq 70$ wt.-%, and wherein the matrix material and the solid material together are present in the carrier material in an amount of $\geq 95$ wt.-%, wherein the matrix material comprises polypropylene, wherein the polypropylene comprises a mixture of a homopolymer and a copolymer, and wherein the homopolymer of the polypropylene has a melt mass flow rate of $\geq 50$ g/10 min, and wherein the melt flow rate of the homopolymer is greater than the melt flow rate of the copolymer, and wherein the homopolymer in the polypropylene is present in an amount from $\geq 10$ wt.-% to $\leq 40$ wt.-%, and/or that the copolymer in the polypropylene is present in an amount from $\geq 60$ wt.-% to $\leq 90$ wt.-%.

2. The carrier material according to claim 1, wherein talcum is present in the form of particles having a particle size $D_{50}$ in a range from $\geq 3$ µm to $\leq 6$ µm, and/or that talcum is present in the form of particles having a particle size $D_{98}$ in a range from $\geq 10$ μm to $\leq 30$ μm.

3. The carrier material according to claim 1, wherein the copolymer has a ball indentation hardness of $\geq 15$ MPa.

4. The carrier material according to claim 1 wherein the density of the copolymer is greater than or equal to the density of the homopolymer.

5. The carrier material according to claim 1, wherein the matrix material further comprises polyethylene in the form of LDPE.

6. The carrier material according to claim 5, wherein the matrix material is free of an adhesion promoter.

7. The carrier material according to claim 1, wherein the carrier material consists of the plastic material, talcum and optionally an adhesion promoter.

8. The carrier material according to claim 1, wherein the solid material in addition to talcum comprises at least one further solid.

9. The carrier material according to claim 8, wherein the further solid has a bulk density in a range of $\leq 2000$ kg/m$^3$, and/or that the further solid is selected from the group consisting of wood, expanded clay, volcanic ash, pumice, cellular concrete, foams and cellulose.

10. A decorated wall or floor panel, comprising a carrier and a decoration applied onto the carrier, wherein a top layer provided with a structure is applied on top of the decoration, wherein the carrier comprises a carrier material according to claim 1.

* * * * *